(12) United States Patent
Yoshigae

(10) Patent No.: US 8,630,027 B2
(45) Date of Patent: *Jan. 14, 2014

(54) IMAGE READING APPARATUS AND IMAGE FORMING APPARATUS

(75) Inventor: Takahisa Yoshigae, Kanagawa (JP)

(73) Assignee: Ricoh Company, Limited, Tokyo (JP)

( * ) Notice: Subject to any disclaimer, the term of this patent is extended or adjusted under 35 U.S.C. 154(b) by 1030 days.

This patent is subject to a terminal disclaimer.

(21) Appl. No.: 12/684,286

(22) Filed: Jan. 8, 2010

(65) Prior Publication Data

US 2010/0177364 A1    Jul. 15, 2010

(30) Foreign Application Priority Data

Jan. 15, 2009    (JP) ................................. 2009-006750

(51) Int. Cl.
*H04N 1/04* (2006.01)
*H04N 1/40* (2006.01)

(52) U.S. Cl.
USPC ........................... 358/483; 358/482; 358/445

(58) Field of Classification Search
USPC ......... 358/445, 446, 483, 482, 505, 512–514; 250/208.1
See application file for complete search history.

(56) References Cited

U.S. PATENT DOCUMENTS

| 2008/0106748 A1* | 5/2008 | Tsukahara et al. ............. 358/1.1 |
| 2011/0063689 A1* | 3/2011 | Yoshigae ....................... 358/445 |
| 2011/0063693 A1* | 3/2011 | Yoshigae ....................... 358/474 |

FOREIGN PATENT DOCUMENTS

| JP | 2001-326768 |   | 11/2001 |
| JP | 2007-143103 | A | 6/2007 |
| JP | 2008-109384 | A | 5/2008 |
| JP | 2008-118366 |   | 5/2008 |

OTHER PUBLICATIONS

Office Action issued Sep. 18, 2012, in Japanese Patent Application No. 2009-006750.

\* cited by examiner

*Primary Examiner* — Cheukfan Lee
(74) *Attorney, Agent, or Firm* — Oblon, Spivak, McClelland, Maier & Neustadt, L.L.P.

(57) ABSTRACT

An image reading apparatus includes a drive unit that drives the line image sensor by frequency-modulated clock; a signal generating unit that generates an analog signal according to a change in frequency of the frequency-modulated clock; an amplification-inversion unit that amplifies the analog signal with an arbitrary amplification factor, and configured to switch between inversion and non-inversion; and a signal superimposing unit that superimposes between the analog image signal and an analog signal output from the amplification-inversion unit.

14 Claims, 8 Drawing Sheets

IMAGE READING APPARATUS AND IMAGE FORMING APPARATUS

CROSS-REFERENCE TO RELATED APPLICATIONS

The present application claims priority to and incorporates by reference the entire contents of Japanese Patent Application No. 2009-006750 filed in Japan on Jan. 15, 2009.

BACKGROUND OF THE INVENTION

1. Field of the Invention

The present invention relates to an image reading apparatus that optically acquires an image of an original, and an image forming apparatus provided with the image reading apparatus.

2. Description of the Related Art

Recently, with the advent of new technology, it has become possible to read image data with high speed. Moreover, the frequency of the reading operation clock has also been increased in association with the speed-up of the reading operation. With the increase in the frequency of the reading operation clock, however, it has become essential to take countermeasures against electromagnetic interference (EMI) due to the regulations on electromagnetic wave intensity (FCC, VCCI, etc.).

An SSCG (spectrum spread clock generator) is generally employed as an effective countermeasure against EMI. This technique involves integrally planarizing the EMI spectrum by frequency-modulating an operation clock frequency within a fine range over a long period.

When the SSCG is in an image reading apparatus, the effect of modulation of the SSCG disadvantageously appears on an image. More specifically, the modulation of the SSCG acts on the driving of a charge-coupled device (CCD) device that is typically used as a photoelectric conversion device and on the operation clock of an analog/digital converter (A/D) whereby an offset level of an image disadvantageously gets synchronized with the period of the SSCG modulation and fluctuates, although slight. This phenomenon becomes visible as a streak PP, a horizontal or oblique streak, on the image (see FIG. 8).

A technology for removing a fluctuation component from an image signal so that the horizontal streak will not appear is known in the art. For example, Japanese Patent Application Laid-open No. 2008-118366 discloses a related art.

In the technology disclosed in Japanese Patent Application Laid-open No. 2008-118366, an image reading apparatus is provided with a function of converting an incident light to an analog image signal with a photoelectric conversion device and digitizing and outputting the analog image signal with an analog-to-digital converter. The image reading apparatus includes a fluctuation removing circuit that drives the photoelectric conversion device by a frequency-modulated clock and superimposes a signal with a fluctuation amount the same as but in inverted phase to the fluctuation of the analog image signal on the image signal according to the change in frequency of the clock (see FIG. 9).

A signal in which amplitude and a phase of a correction signal to be superimposed on the image signal are previously set is generated and is superimposed on the image signal. As an implementation example thereof, it is configured to cause a bias current of an emitter-follower connected transistor to change.

However, because the amplitude and the phase of the correction signal to be superimposed on the image signal are previously set, the conventional technology may lead to such a situation that it cannot deal with a case in which offset fluctuation due to the effect of the SSCG is not uniform in each device.

SUMMARY OF THE INVENTION

It is an object of the present invention to at least partially solve the problems in the conventional technology.

According to an aspect of the present invention there is provided an image reading apparatus that emits light to an original, collects light reflected from the original, converts collected light to an analog image signal by using a line image sensor, subjects the analog image signal to analog signal processing thereby obtaining a processed analog image signal, converts the processed analog image signal to a digital image signal by using an analog/digital converter, and outputs the digital image signal. The image reading apparatus includes a drive unit that drives the line image sensor by frequency-modulated clock; a signal generating unit that generates an analog signal according to a change in frequency of the frequency-modulated clock; an amplification-inversion unit that amplifies the analog signal with an arbitrary amplification factor, and configured to switch between inversion and non-inversion; and a signal superimposing unit that superimposes between the analog image signal and an analog signal output from the amplification-inversion unit.

According to another aspect of the present invention there is provided an image forming apparatus comprising the above image reading apparatus.

According to still another aspect of the present invention there is provided an image reading apparatus that emits light to an original, collects light reflected from the original, converts collected light to an analog image signal by using a line image sensor, subjects the analog image signal to analog signal processing thereby obtaining a processed analog image signal, converts the processed analog image signal to a digital image signal by using an analog/digital converter, and outputs the digital image signal. The image reading apparatus including driving means for driving the line image sensor by frequency-modulated clock; signal generating means for generating an analog signal according to a change in frequency of the frequency-modulated clock; amplification-inversion means for amplifying the analog signal with an arbitrary amplification factor, and configured to switch between inversion and non-inversion; and signal superimposing means for superimposing between the analog image signal and an analog signal output from the amplification-inversion means.

According to still another aspect of the present invention there is provided an image forming apparatus comprising the above image reading apparatus.

According to still another aspect of the present invention there is provided an image reading method implemented on an image reading apparatus that emits light to an original, collects light reflected from the original, converts collected light to an analog image signal by using a line image sensor, subjects the analog image signal to analog signal processing thereby obtaining a processed analog image signal, converts the processed analog image signal to a digital image signal by using an analog/digital converter, and outputs the digital image signal. The image reading method includes driving the line image sensor by frequency-modulated clock; generating an analog signal according to a change in frequency of the frequency-modulated clock; amplifying the analog signal with an arbitrary amplification factor, and switching between inversion and non-inversion; and superimposing between the analog image signal and an analog signal obtained at the amplifying.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Exemplary embodiments of the present invention are explained in detail below with reference to the accompanying drawings.

Figure 1:
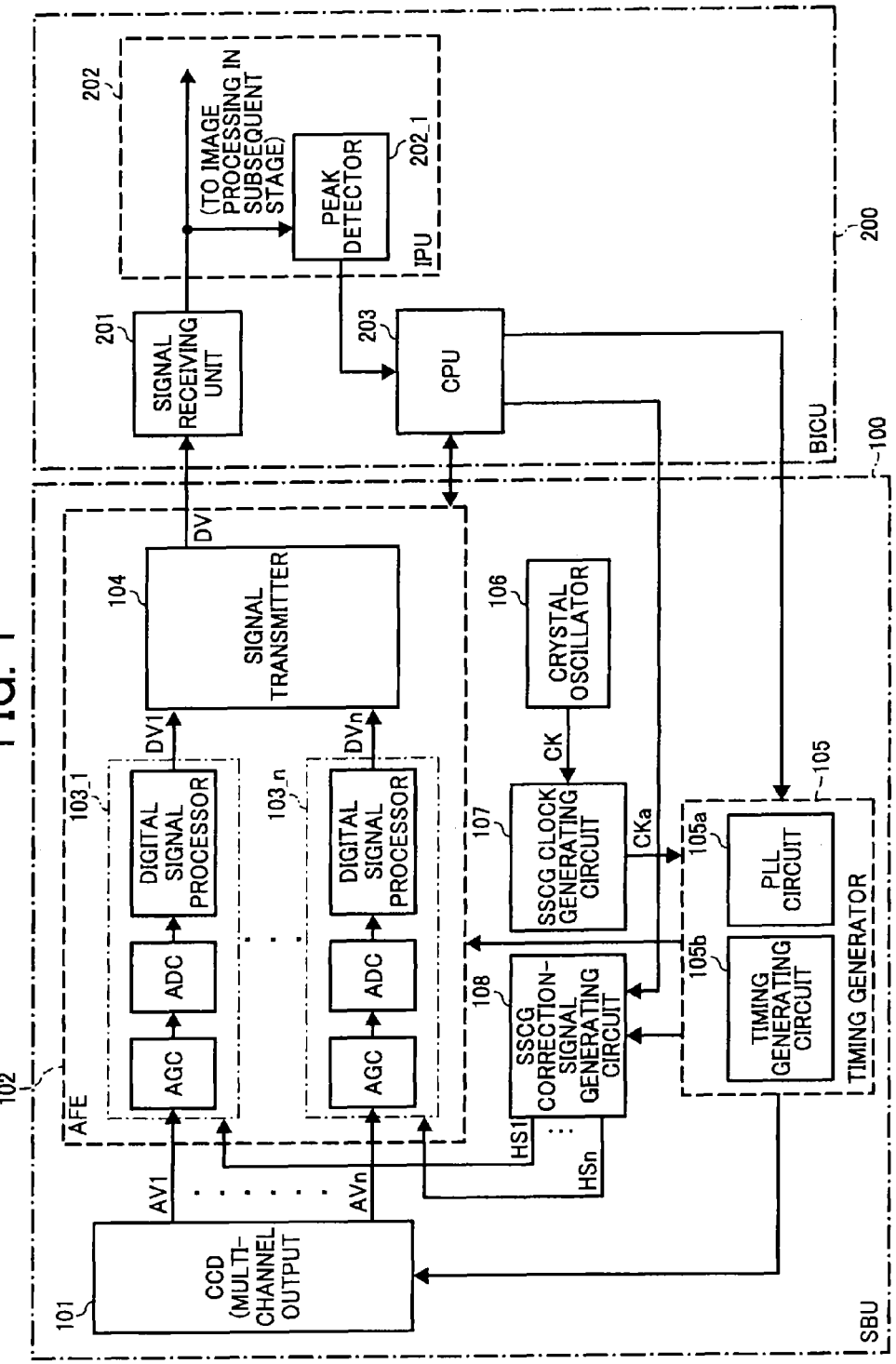
FIG. 1 is a block diagram representing one example of a main portion of a picture-signal processing system in an image reading apparatus according to an embodiment of the present invention.

FIG. 1 represents one example of a main portion of a picture-signal processing system in an image reading apparatus according to an embodiment of the present invention. The image reading apparatus uses a so-called reduced optical system in which an original to be read is set on a contact glass and an image area is operated by a scanning optical system, to be converged to a CCD line image sensor 101 provided in a sensor board unit (SBU) 100. The CCD line image sensor (CCD) 101 is divided into a plurality (n) of blocks for the purpose of high-speed reading, and read picture signals from the blocks are output from independent output channels respectively.

Read analog picture signals AV1 to AVn for n channels output from the CCD line image sensor 101 are input to n units of analog processing units 103_1 to 103_n, respectively, provided in an analog front end (AFE) 102.

The analog front end 102 is an application specific integrated circuit (ASIC) that performs analog processing, analog/digital (A/D) conversion processing, and digital signal processing.

The read analog picture signals AV1 to AVn input to the analog processing units 103_1 to 103_n of the analog front end 102 are respectively amplified with predetermined gains by variable gain amplifiers (VGA or AGC), are converted to corresponding digital signals by analog/digital converters (ADC), and predetermined digital processing is applied thereto by digital signal processors, respectively. The results of the processing as digital picture signals DV1 to DVn are added to a signal transmitter 104.

The signal transmitter 104 connects n-channel digital picture signals DV1 to DVn to one another to obtain a continuous digital picture signal DV for one line, and transmits it to a signal receiver 201 of a board control unit (BICU) 200 provided at a subsequent stage.

The gains of the variable gain amplifiers are programmably set to accommodate variations between parts of a lamp of the reduced optical system and sensitivity variations of the CCD line image sensor 101, and the gains are controlled to determine set values when power is turned on or each time when image data is read so that a digital output is set to a fixed one at the time of reading a reference white level (so-called shading correction processing).

The digital signal processor uses the predetermined digital signal processing (for example, gamma correction processing). Furthermore, a low-voltage differential signaling (LVDS) transmitter is used as the signal transmitter 104, and a LVDS receiver is used as the signal receiver 201.

The digital picture signal DV received by the signal receiver 201 is output to a peak detector 202_1 of an image processing unit (IPU) 202, and is also output to an image processing unit in a subsequent stage (not shown).

In the sensor board unit 100, a timing generator 105 generates a control signal for driving the CCD line image sensor 101 and the analog front end 102, and includes a PLL (phase locked loop) circuit 105a that generates a basic clock signal or the like, and a timing generating circuit 105b that generates a control signal for driving the CCD line image sensor 101 and the analog front end 102 based on the clock signal or the like generated by the PLL circuit 105a.

The basic clock signal to be added to the PLL circuit 105a is a clock signal CKa in which an oscillation signal CK of a crystal oscillator 106 is added to an SSCG clock generating circuit 107 and frequency modulation of the SSCG (hereinafter, called "SSCG modulation") is applied to the oscillation signal.

Therefore, the effect of the SSCG modulation appears on the read analog picture signals AV1 to AVn for the channels output from the CCD line image sensor 101, and thus, as explained above, the level of these signals periodically changes with a certain range.

An SSCG correction-signal generating circuit 108 generates correction signals HS1 to HSn for correcting the read analog picture signals AV1 to AVn respectively based on the signal of the timing generator 105 so that the effect of the SSCG modulation can be removed. The correction signals HS1 to HSn are added to the analog processing units 103_1 to 103_n of the analog front end 102 respectively.

In the board control unit 200, the peak detector 202_1 detects a peak value and a bottom value of the digital picture signal DV for each channel of the read analog picture signals AV1 to AVn, and supplies the detected values to a central processing unit (CPU) 203 of the board control unit 200.

The CPU 203 controls an operation of the board control unit 200 and an operation of each element of the sensor board unit 100. More specifically, the CPU 203 controls the operations of the timing generator 105 and the analog front end 102 and also controls, for generation of the SSCG correction signals, the operation of the SSCG correction-signal generating circuit 108 based on the peak value and the bottom value for each channel added from the peak detector 202_1.

Figure 2:
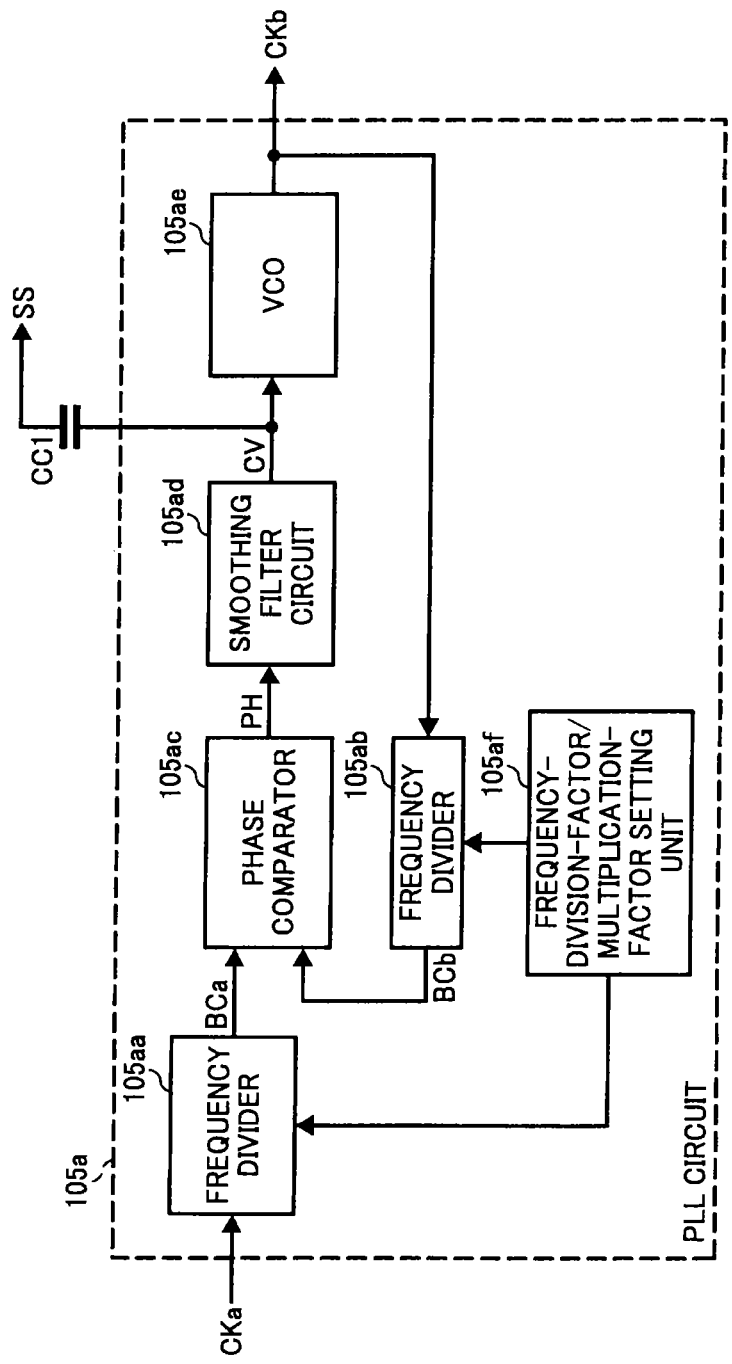
FIG. 2 is a block diagram of an exemplary configuration of a PLL circuit shown in FIG. 1.

An exemplary configuration of the PLL circuit 105a is shown in FIG. 2. The PLL circuit 105a has a function to set a frequency division factor and a multiplication factor through setting.

In the PLL circuit 105a, a phase comparator 105ac first compares the phase of a signal BCa in which the SSCG-modulated clock signal CKa input from an external device is frequency-divided by a frequency divider 105aa with the phase of a signal BCb in which an internal clock signal CKb is frequency-divided by a frequency divider 105ab. The phase comparator 105ac outputs a pulse signal PH whose duty changes according to a phase comparison between the signal BCa and the signal BCb.

The pulse signal PH is supplied to a smoothing filter circuit 105ad, where it is integrated to be converted to a voltage CV that depends on the duty of the pulse signal PH. More specifically, the smoothing filter circuit 105ad operates as a frequency-voltage converting function for converting the pulse signal PH to the voltage CV.

The voltage CV is applied to a voltage-controlled oscillator (VCO) 105ae. The voltage-controlled oscillator 105ae outputs a pulse with a frequency according to the input voltage CV. An output pulse of the voltage-controlled oscillator 105ae is output as the internal clock signal CKb and it is also fed back to the frequency divider 105ab.

Each frequency division factor and each multiplication factor of the frequency dividers 105aa and 105ab are set by a frequency-division-factor/multiplication-factor setting unit 105af that is controlled by the CPU 203.

As for the voltage CV output from the smoothing filter circuit 105ad, only its alternating-current (AC) component is output as an analog signal SS to the SSCG correction-signal generating circuit 108 through an AC-coupling capacitor CC1.

In the configuration of the PLL circuit 105a, the duty of the pulse signal PH output from the phase comparator 105ac changes according to the result of phase comparison. Therefore, the voltage level of the signal CV being smoothed pulse signal PH changes according to the duty of the pulse signal PH (frequency-voltage conversion as explained above).

Therefore, when the SSCG-modulated clock signal CKa is input to the PLL circuit 105a as explained in the above case, the voltage CV, after being smoothed, input to the voltage-controlled oscillator 105ae becomes a voltage signal in synchronization with a period of the SSCG modulation. By extracting this voltage signal through the AC-coupling capacitor CC1, a direct-current (DC) component is removed, and the AC component is used as the analog signal SS in synchronization with the period of the SSCG modulation.

Figure 3:
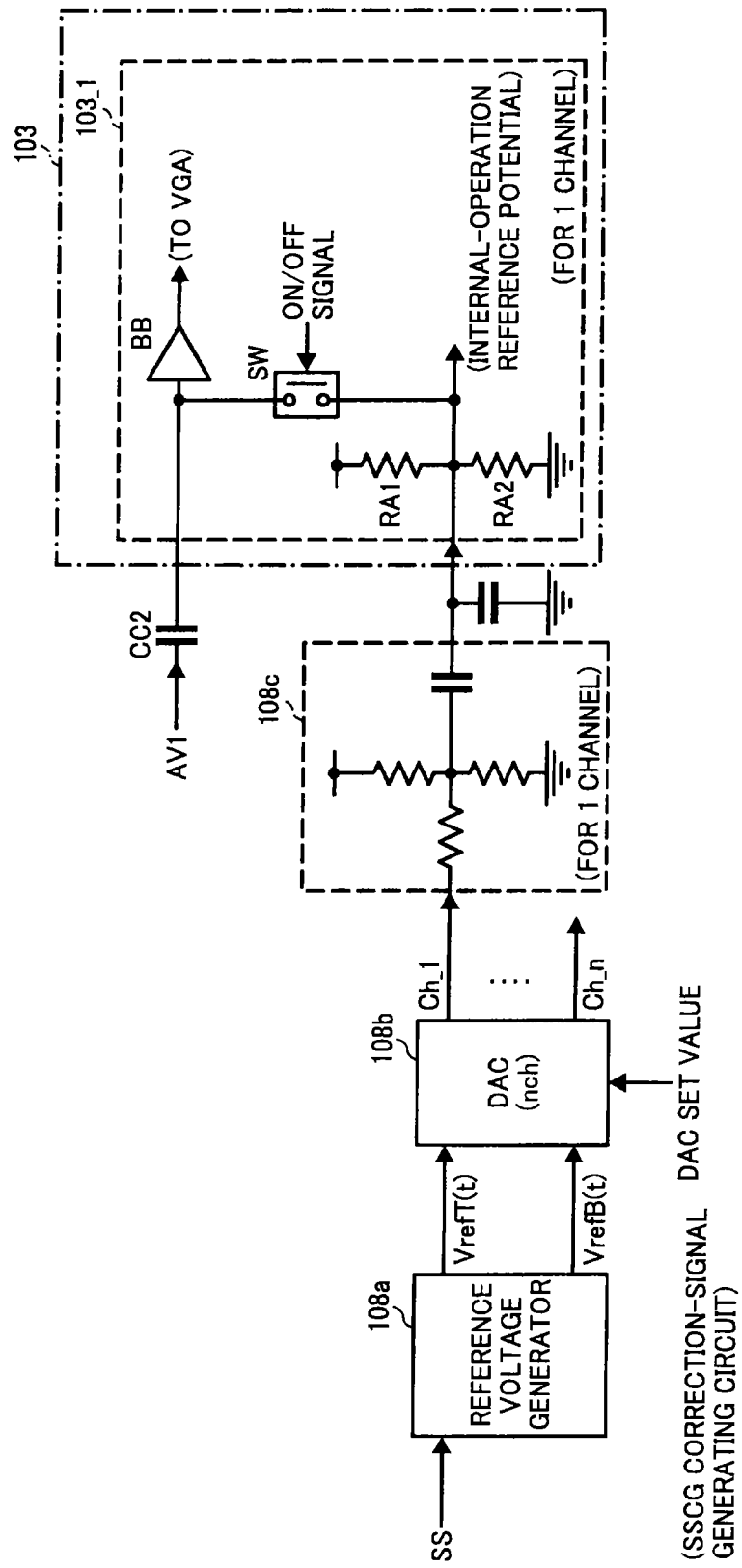
FIG. 3 is a block diagram of an exemplary configuration of an SSCG correction-signal generating circuit shown in FIG. 1.

An exemplary configuration of the SSCG correction-signal generating circuit 108 is shown in FIG. 3. In the embodiment, a digital/analog converter (DAC) 108b with the same number of channels as these of the CCD line image sensor 101 is used as a generator of a correction signal, and this allows an arbitrary amplification factor and switching between inversion and non-inversion.

A signal output from each of the channels Ch_1 to Ch_n in the DAC 108b is supplied to a clamp-potential input end that sets an internal-operation reference potential of any one of the analog processing units 103_1 to 103_n for the corresponding channel of the analog front end 102 through an output circuit 108c.

Meanwhile, voltage-dividing resistors RA1 and RA2 for setting a clamp potential are internally provided in each of the analog processing units 103_1 to 103_n, and a divided voltage value of the voltage-dividing resistors RA1 and RA2 is supplied to an internal circuit, as the internal-operation reference potential.

Therefore, similarly to the signals output through the channels of the DAC 108b, the voltage supplied from the outside to the clamp-potential input end operates as a superimposed potential component for displacing the internal-operation reference potential.

Input into the analog processing unit 103_1 is the read analog picture signal AV1 through an AC-coupling capacitor CC2, and the input signal is taken in the inner side thereof through a buffer amplifier BB.

Added also to an input end of the buffer amplifier BB is the signal added to the clamp-potential input end through a clamp switch SW.

Figure 4:
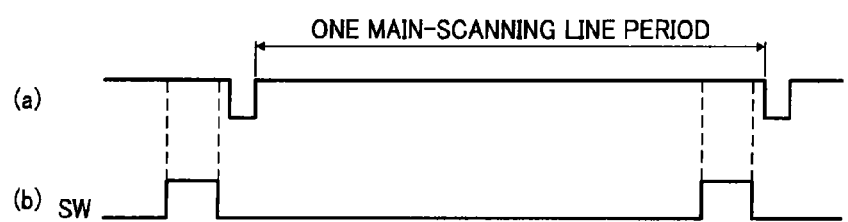
FIG. 4 is a timing chart for explaining superimposing of a correction signal on an internal-operation reference potential of AFE.

As shown in (a) and (b) of FIG. 4, the clamp switch SW is turned ON for a predetermined period right before the start of a one main-scanning line period. This allows a voltage signal at the clamp-potential input end to be charged, and an output value of the buffer amplifier BB is charged to a voltage value of the voltage signal.

During one main-scanning line period, the output value of the buffer amplifier BB becomes a value on which the value of the read analog picture signal AV1 is superimposed based on a value of initially charged voltage as a reference, and the value is output to a circuit in the subsequent stage.

More specifically, by superimposing the correction signal (output signal of each channel in the DAC 108b) on the clamp-potential input end, the correction signal is superimposed on the internal-operation reference potential, and as a result, the effect of the SSCG modulation can be removed.

Figure 5:
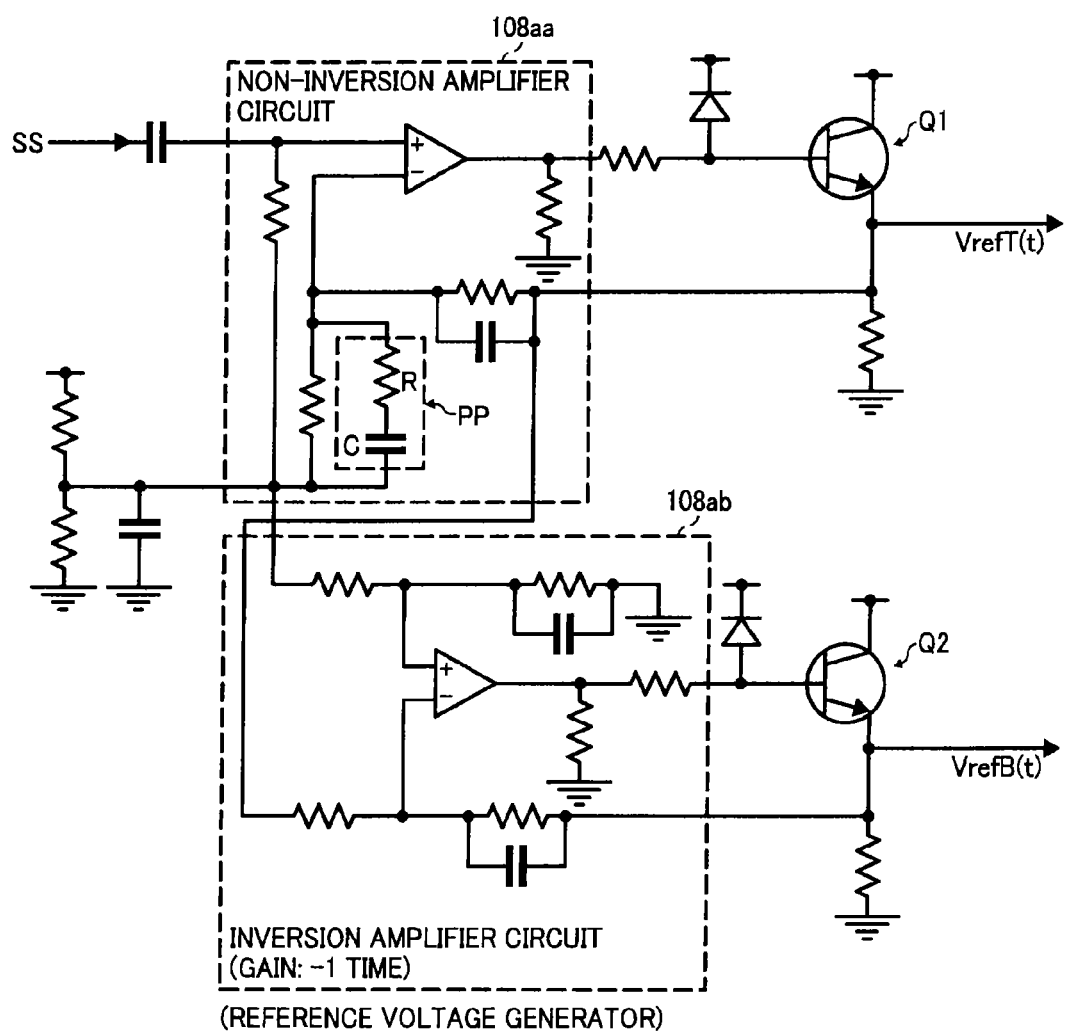
FIG. 5 is a circuit diagram of an exemplary configuration of a reference voltage generator shown in FIG. 3.

Referring back to FIG. 3, reference potentials (VrefT(t) and VrefB(t)) are generated in a reference voltage generator 108a from the analog signal SS output from the PLL circuit 105a of the timing generator 105 and are supplied to the DAC 108b. At this time, as shown in FIG. 5, the signals are generated in such a manner that AC components of the VrefT(t) and VrefB(t) have amplitudes the same as each other but have phases inverted to each other.

More specifically, because the analog signal SS extracted from the PLL circuit 105a has small amplitude, the analog signal SS is amplified by a non-inversion amplifier circuit 108aa and an inversion amplifier circuit 108ab, and is supplied as the reference potentials (VrefT(t) and VrefB(t)) from the reference voltage generator 108a.

The non-inversion amplifier circuit 108aa is composed of an amplifier circuit with fixed gain using an operational amplifier, and a phase compensating circuit PP formed with a series circuit of a resistor R and a capacitor C is provided, for its inversion input, in a resistance portion where an amplification factor of the gain is determined. An output signal of the non-inversion amplifier circuit 108aa in a state in which a predetermined offset voltage is superimposed on the output signal is added, as the reference potential VrefT(t), to the DAC 108b through a transistor emitter-follower circuit Q1.

Moreover, an output voltage of the non-inversion amplifier circuit 108aa is inverted and amplified by the inversion amplifier circuit 108ab in which the gain is set to minus 1 time, and an output signal of the inversion amplifier circuit 108ab in a state in which a predetermined offset voltage is superimposed on the output signal is input, as the reference potential VrefB(t), to the DAC 108b through a transistor emitter-follower circuit Q2. The inversion amplifier circuit 108ab is also composed of an amplifier circuit with fixed gain using an operational amplifier.

More specifically, the reference voltage generator 108a amplifies the analog signal SS extracted from the timing generator 105 by the non-inversion amplifier circuit 108aa with certain fixed gain, and an offset voltage is superimposed on the amplified analog signal to obtain a signal, and the signal as the reference potential VrefT(t) is supplied to the DAC 108b.

Furthermore, a signal in which the phase of the signal of the reference potential VrefT(t) is inverted is generated as a supply signal to the reference potential VrefB(t). The phase inversion is implemented by an inversion amplifier circuit using an operational amplifier in which the gain is minus 1 time. A signal with the offset voltage superimposed on the signal of which phase is inverted is supplied, as the reference potential VrefB(t), to the DAC 108b.

In this manner, by inputting each signal with inverted phase to the phase of the signal in synchronization with the period of SSCG modulation to VrefT(t) and VrefB(t), respectively, which are the reference voltages for the DAC 108b, and performing DAC setting (to set a digital input value to be given to the DAC 108b), it is possible to obtain a correction signal with an arbitrary amplitude in synchronization with the period of the SSCG modulation.

The correction signal is explained next.

First, an output voltage from DAC is shown by the following Equation (I).

$$Vdac\_out(t)=(VrefT(t)-VrefB(t))\times Dac\_set/FullScale+VrefB(t) \qquad (I)$$

Dac_set: Set value to DAC (if 8 bits, 0 to 255)
Full/Scale: Full scale of DAC (if 8 bits, 255)
VrefT(t): Upper reference potential
VrefB(t): Lower reference potential
$\alpha(t)$: Analog signal (AC signal) extracted in PLL portion after being amplified
Vdac_out(t): Output of DAC
Here, because AC components of the two reference potentials have the same amplitudes but inverted phases $$VrefT(t)=VrefT\_dc+\alpha(t)$$

$$VrefB(t)=VrefB\_dc-\alpha(t)$$

VrefT_dc and VrefB_dc are DC components.
Therefore, the Equation (I) becomes $$Vdac\_out(t)=(\alpha(t)+\alpha(t))\times Dac\_set/FullScale-\alpha(t)+(VrefT\_dc-VrefB\_dc)\times Dac\_set/FullScale+VrefB\_dc,$$

and a signal can thereby be obtained so that an amplitude and a polarity of the AC component (Vdac_out(t)_AC) can be set by the set values of the reference voltage generator 108a.
Moreover, $$Vdac\_out(t)\_AC=2\alpha(t)\times Dac\_set/FullScale-\alpha(t)=(2\times Dac\_set/FullScale-1)\times \alpha(t)$$

For example, it is considered that 8 bits are set in the DAC 108b, and
if Set: 255, Vdac_out(t)_AC=$\alpha(t)$
if Set: 128, Vdac_out(t)_AC≅0
if Set: 0, Vdac_out(t)_AC=$-\alpha(t)$,
so that it is possible to perform arbitrary setting and switch between inversion and non-inversion.

Here, if a multi-channel DAC set through universal serial communication is used as the DAC 108b, because of low response characteristic to a change in output with respect to the change in the reference voltage, the phase of a correction signal obtained as an output signal of the DAC 108b is delayed.

Therefore, by increasing the amplification factor of a high-frequency component in a portion of generating a reference potential for the DAC 108b to give a frequency characteristic to the portion so as to advance the phase, it is possible to compensate for the low response characteristic of the DAC 108b.

Figure 6:
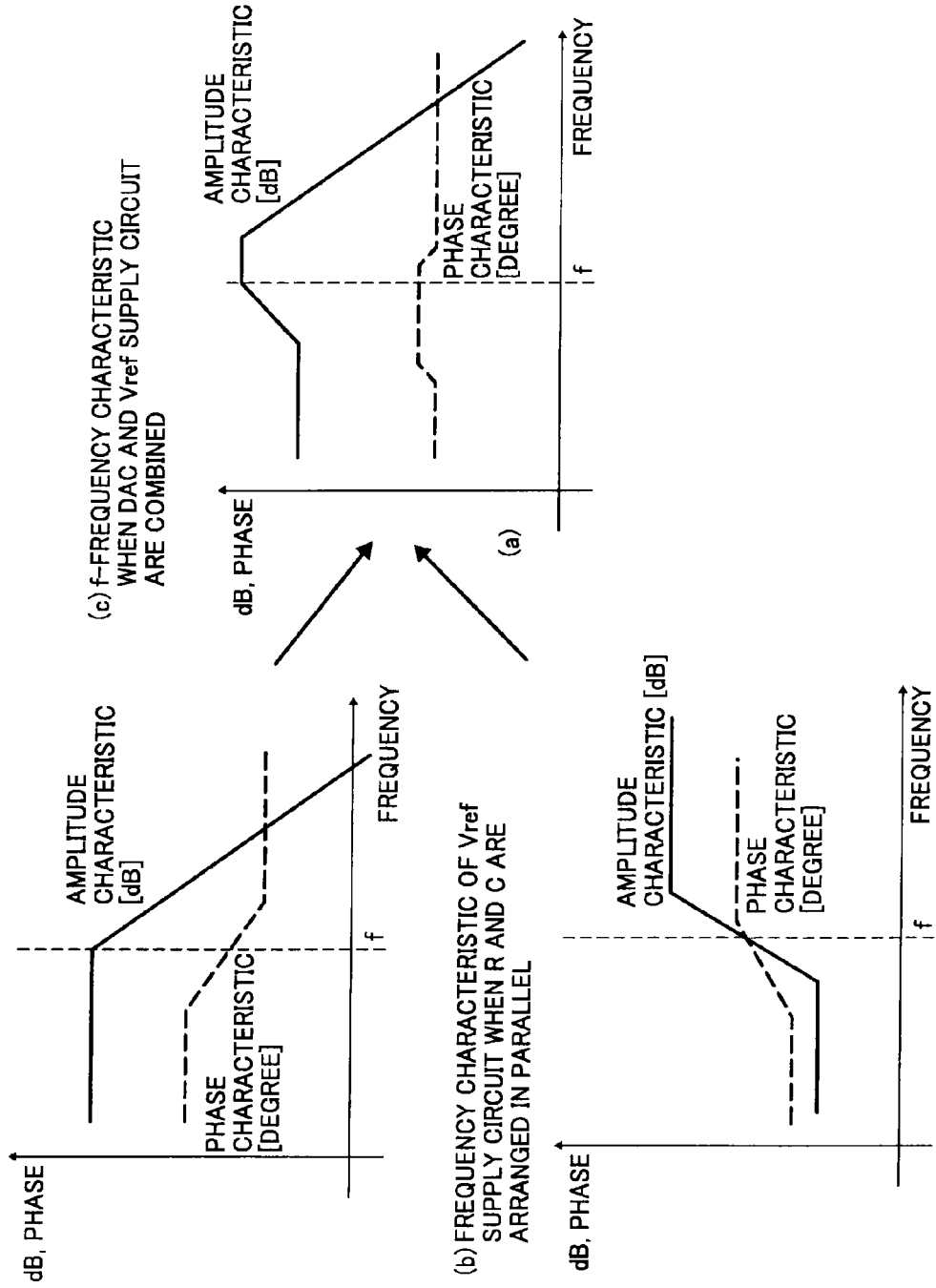
FIG. 6 depicts graphs for explaining improvement of a frequency characteristic of DAC.

In the embodiment, phase compensating circuits PP are connected in parallel to each other in the resistance portion, of the non-inversion amplifier circuit 108aa configured shown in FIG. 5, where the amplification factor of the gain is determined, to increase the amplification factor of the high-frequency component, which allows the characteristic for advancing the phase to be given to the portion (see (b) in FIG. 6).

With this feature, in the high-frequency component, the amplification factor is increased caused by the effect of a capacitor component of the phase compensating circuit PP, which results in advance of the phase. Here, for the frequency characteristic, constants of the resistor R and capacitor C are previously set based on the response characteristic of the DAC 108b.

In this manner, by giving the frequency characteristic to supply circuit portions of the reference potentials VrefT(t) and VrefB(t), it is possible to compensate for phase delay of the DAC even in the case of using the DAC with low response characteristic (see (c) in FIG. 6).

In the configuration, the set values of the DAC 108b are set so that the amplitudes are the same as but the phases are inverted to offset fluctuations of the read analog picture signals AV1 to AVn occurring due to the effect of the SSCG. This allows cancel-out of the offset fluctuations of the read analog picture signals AV1 to AVn, to correct the offset fluctuations of the read analog picture signals AV1 to AVn occurring due to the effect of the SSCG.

Here, an arbitrary updating method can be used as the method of updating the set value of the DAC 108b if it is the method of updating the set value whose amplitude is finally the same as but phase is inversed to the offset fluctuation of the analog image signal occurring due to the effect of the SSCG.

Figure 7:
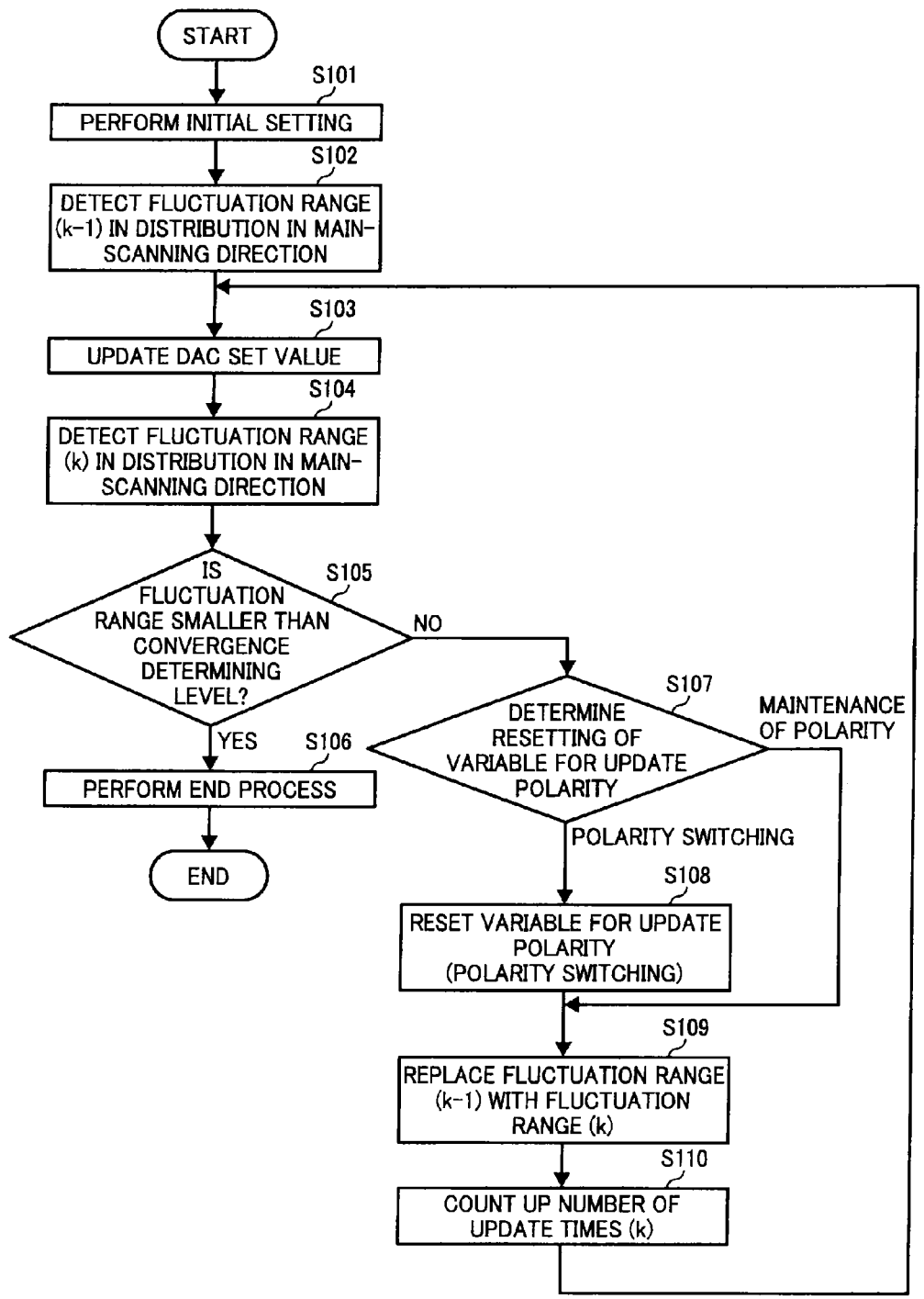
FIG. 7 is a flowchart for explaining one example of a method for updating a set value of a DAC shown in FIG. 3.
Figure 8:
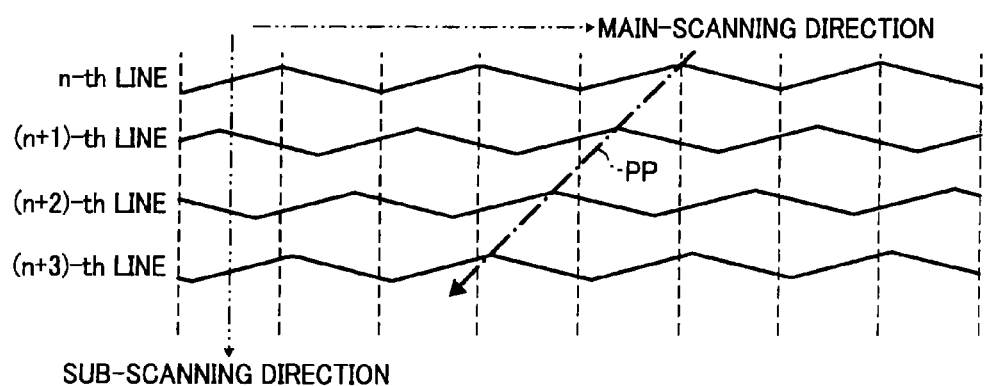
FIG. 8 is a schematic diagram for explaining the effect of the SSCG on a read image.
Figure 9:
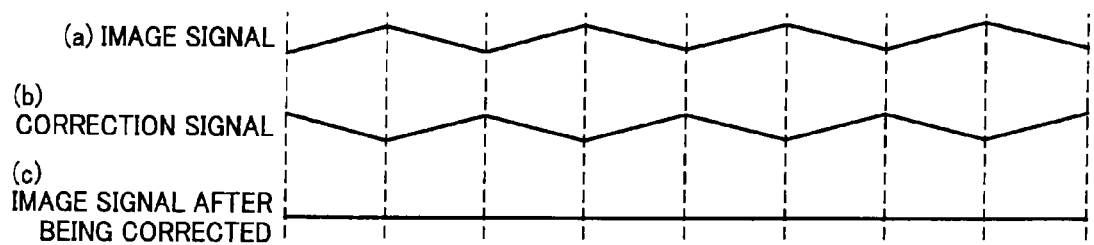
FIG. 9 is a schematic diagram for explaining a method of cancelling the effect of the SSCG on the read image.

One example of the updating method is explained below with reference to FIG. 7.

First, as initial setting, variables and conditions are set (Step S101).
Lamp←Off
AFE gain←10 times
One line period←Set to integral times of a period of SSCG modulation
DAC set value_nch_(k−1)←128
Variable for update polarity_nch←+1
Explanation of the Variables and Constants
Lamp: Lamp is set to an off state in order to detect offset fluctuation due to effect of the SSCG,
AFE gain: Set to a state in which a detection sensitivity is increased based on an amplification factor of the read analog picture signal as 10 times,
DAC set_nch_(k−1): Set value to nch of the DAC 108b upon a (k−1)-th update process. Adjustment of the amplitude of the correction signal is started from the state of 0. (The set value is set in DAC set value_nch_(k−1) being a variable and is also set in the DAC 108b), and
Variable for update polarity_nch: Variable used to set whether addition or subtraction is performed when the DAC set value is updated. Either one of values of −1 and +1 is selected, but in the initial setting, it is temporarily set to +1.

A fluctuation range is detected after performance of the initial setting (Step S102). Detection of the fluctuation range is implemented by reading image data and detecting a fluctuation range in the main-scanning direction from the read image data. In the detection of the fluctuation range, the fluctuation range is detected from a distribution of random noise components in the main-scanning direction after averaging process in a sub-scanning direction is performed thereon for each pixel in order to reduce the random noise components. The fluctuation range detected here is held in fluctuation range_nch_(k−1) as a variable.

Next, the updating process of the DAC set value is performed (Step S103).

$$DAC\ set\ value\_nch\_(k) = DAC\ set\ value\_nch\_(k-1) + (\text{Variable for update polarity}\_nch) \times (\text{coefficient}) \times \text{Fluctuation range}\_nch(k-1)$$

Explanation of the Variable and Constant

Coefficient: Set according to system (0 Fluctuation range_nch_(k−1): Result of detection of a fluctuation range in the main-scanning direction upon a (k−1)-th updating process).

After the set value of the DAC is updated, a fluctuation range of the image data is detected in the main-scanning direction of reading in the similar manner to the above, and the detected fluctuation range as a variable is held in fluctuation range_nch_(k) (Step S104).

If the detected fluctuation range_nch_(k) is smaller than a preset convergence determining level, then the updating process of the DAC set value is ended (Step S106).

If the detected fluctuation range_nch_(k) is larger than the preset convergence determining level, then the updating process is repeated (NO loop at Step S105).

Here, before the DAC set value is updated, resetting of the variable for update polarity is implemented (Steps S107 to S110).

If fluctuation range_nch_(k)≤fluctuation range_nch_(k−1): Variable for update polarity remains as it is.

If fluctuation range_nch_(k)>fluctuation range_nch_(k−1): Variable for update polarity_nch=variable for update polarity_nch×(−1) is implemented to invert the update polarity.

The fluctuation range_nch_(k) is replaced with the fluctuation range_nch_(k−1) after the resetting of the variable for update polarity and the updating process of the DAC set value is repeated until it becomes smaller than the convergence determining level.

By performing the adjusting process of the DAC set value, an appropriate set value for reducing the offset fluctuation due to the effect of the SSCG can be obtained, thus reducing streaks on an image.

Incidentally, the offset fluctuation due to the effect of the SSCG is largely affected by the device property of the CCD line image sensor 101, and thus a case in which an amount of offset fluctuation changes dependent on thermal property or the like can be considered.

In the image reading apparatus in which such the CCD line image sensor 101 is used, even if the updating process of the DAC set value is performed and streaks on the image are reduced, the amount of offset fluctuation changes over time caused by the effect of the SSCG, which results in appearance of streaks due to the effect of the SSCG on the image again.

In this case also, by providing the process for implementing the adjusting process of the DAC set value in an arbitrary time interval in the system process, it is possible to deal with temporal change in the amount of offset fluctuation due to the effect of the SSCG.

For example, by providing a mode for monitoring a continuous energization time of the image reading apparatus provided with the functions according to the embodiment and implementing the adjusting process of the DAC set value in each fixed time, the present invention can also deal with temporal change in the offset fluctuation due to the effect of the SSCG.

Furthermore, the image forming apparatus provided with the image reading apparatus according to the present invention allows image formation based on image information in which streaks due to the effect of the SSCG are reduced.

As explained above, according to the embodiment, it is possible to reduce a streak image as a problem on the streak image on an image in the reading apparatus using the SSCG.

Moreover, even if offset fluctuation due to the effect of the SSCG is not uniform in each device, it can be corrected and the correction can be implemented with a low cost configuration.

Furthermore, by extracting the analog signal in synchronization with the period of the SSCG modulation from the PLL block inside the timing generator that generates a CCD drive signal, the analog signal in synchronization with the period of the SSCG modulation can be extracted without newly providing a complicated circuit.

Moreover, in the image reading apparatus using an analog ASIC in which the analog processing and the A/D conversion processing on the image signal are implemented in an integrated circuit, it is possible to reduce a streak image due to the effect of the SSCG.

Furthermore, when a correction signal generated in order to reduce a streak due to the effect of the SSCG is superimposed on an image signal, the correction signal is superimposed on a clamp potential of the ASIC for analog processing through AC coupling, which allows reduction of the streak due to the effect of the SSCG without newly providing a complicated circuit.

Moreover, by adjusting the correction signal from a feature amount obtained through an image processing path the same as an ordinary image reading operation performed upon generation of the correction signal, it is possible to generate a correction signal without addition of a mechanism of extracting a feature amount only for generation of the correction signal.

Furthermore, the image reading apparatus is configured to perform an adjusting process independently from other controls, and thus, even if the streak image due to the effect of the SSCG changes over time, correction becomes possible.

Moreover, it is possible to provide the image forming apparatus with the image reading apparatus in which the effect of the SSCG can be reduced.

It should be noted that the embodiment has explained the case in which the present invention is applied to the image reading apparatus provided with the reduced optical system, however, the present invention can be also applied to an image reading apparatus provided with a full-size optical system.

Moreover, the present invention can be also applied to any image forming apparatus provided with the image reading apparatus, for example, a copier, a digital copier, a digital multifunction product, and a network-ready multifunction product.

Therefore, according to the present invention, it is possible to correct a problem on a streak image to an image in the reading apparatus using the SSCG even if offset fluctuation due to the effect of the SSCG is not uniform in each device, and to implement the correction with a low cost configuration.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An image reading apparatus that emits light to an original, collects light reflected from the original, converts collected light to an analog image signal by using a line image sensor, subjects the analog image signal to analog signal processing thereby obtaining a processed analog image signal, converts the processed analog image signal to a digital image signal by using an analog/digital converter, and outputs the digital image signal, the image reading apparatus comprising:
- a drive unit that drives the line image sensor by frequency-modulated clock;
- a signal generating unit that generates an analog signal according to a change in frequency of the frequency-modulated clock;
- an amplification-inversion unit that amplifies the analog signal with an arbitrary amplification factor, and configured to switch between inversion and non-inversion; and
- a signal superimposing unit that superimposes the analog image signal on the analog signal output from the amplification-inversion unit.

2. The image reading apparatus according to claim 1, wherein
the amplification-inversion unit includes a reference-signal generating unit that generates two analog signals, from the analog signal, whose amplitudes are same as each other but phases are inverted to each other, and
the analog signals are supplied as two reference voltages of a digital/analog converter, where digital values to be given to the digital/analog converter are switched to each other, which allows an arbitrary amplification factor and switching between inversion and non-inversion.

3. The image reading apparatus according to claim 2, wherein the reference-signal generating unit includes a circuit element having a frequency characteristic so as to further amplify each high-frequency component of the analog signals.

4. The image reading apparatus according to claim 2, wherein
the line image sensor is divided into a plurality of channels,
the digital/analog converter of the amplification-inversion unit is provided corresponding to each of the channels, and
each of the digital/analog converters includes a general-purpose circuit configured to set a digital value through serial communication.

5. An image forming apparatus comprising an image reading apparatus according to claim 1.

6. An image reading apparatus that emits light to an original, collects light reflected from the original, converts collected light to an analog image signal by using a line image sensor, subjects the analog image signal to analog signal processing thereby obtaining a processed analog image signal, converts the processed analog image signal to a digital image signal by using an analog/digital converter, and outputs the digital image signal, the image reading apparatus comprising:
- driving means for driving the line image sensor by frequency-modulated clock;
- signal generating means for generating an analog signal according to a change in frequency of the frequency-modulated clock;
- amplification-inversion means for amplifying the analog signal with an arbitrary amplification factor, and configured to switch between inversion and non-inversion; and
- signal superimposing means for superimposing the analog image signal on the analog signal output from the amplification-inversion means.

7. The image reading apparatus according to claim 6, wherein
the amplification-inversion means includes reference-signal generating means for generating two analog signals, from the analog signal, whose amplitudes are same as each other but phases are inverted to each other, and
the analog signals are supplied to two reference voltages of digital/analog converting means, where digital values to be given to the digital/analog converting means are switched to each other, which allows an arbitrary amplification factor and switching between inversion and non-inversion.

8. The image reading apparatus according to claim 7, wherein the reference-signal generating means includes a circuit element having a frequency characteristic so as to further amplify each high-frequency component of the analog signals.

9. The image reading apparatus according to claim 7, wherein
the line image sensor is divided into a plurality of channels,
the digital/analog converting means of the amplification-inversion means is provided corresponding to each of the channels, and
each of the digital/analog converting means includes a general-purpose circuit configured to set a digital value through serial communication.

10. An image forming apparatus comprising an image reading apparatus according to claim 6.

11. An image reading method implemented on an image reading apparatus that emits light to an original, collects light reflected from the original, converts collected light to an analog image signal by using a line image sensor, subjects the analog image signal to analog signal processing thereby obtaining a processed analog image signal, converts the processed analog image signal to a digital image signal by using an analog/digital converter, and outputs the digital image signal, the image reading method comprising:
- driving the line image sensor by frequency-modulated clock;
- generating an analog signal according to a change in frequency of the frequency-modulated clock;
- amplifying the analog signal with an arbitrary amplification factor, and switching between inversion and non-inversion; and
- superimposing the analog image signal on the analog signal obtained at the amplifying.

12. The image reading method according to claim 11, wherein
the amplifying includes generating two analog signals, from the analog signal, whose amplitudes are same as each other but phases are inverted to each other, and
the analog signals are supplied to two reference voltages of a digital/analog converter, where digital values to be given to the digital/analog converter are switched to each other, which allows an arbitrary amplification factor and switching between inversion and non-inversion.

13. The image reading method according to claim 12, wherein the generating includes generating the reference-signal generating with a circuit element having a frequency characteristic so as to further amplify each high-frequency component of the analog signals.

14. The image reading method according to claim 12, wherein
the line image sensor is divided into a plurality of channels,
the digital/analog converter of the amplification-inversion unit is provided corresponding to each of the channels, and each of the digital/analog converters includes a general-purpose circuit configured to set a digital value through serial communication.

* * * * *